United States Patent
Qiu

(10) Patent No.: US 12,481,337 B2
(45) Date of Patent: Nov. 25, 2025

(54) METHOD FOR RESETTING BASEBOARD MANAGEMENT CONTROLLER AND POWER MANAGEMENT SYSTEM

(71) Applicant: Fulian Precision Electronics (Tianjin) Co., LTD., Tianjin (CN)

(72) Inventor: Duo Qiu, Tianjin (CN)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 208 days.

(21) Appl. No.: 18/374,305

(22) Filed: Sep. 28, 2023

(65) Prior Publication Data

US 2024/0160264 A1    May 16, 2024

(30) Foreign Application Priority Data

Nov. 12, 2022  (CN) .......................... 202211416251.9

(51) Int. Cl.
*G06F 1/26* (2006.01)
*G06F 13/42* (2006.01)

(52) U.S. Cl.
CPC ............ *G06F 1/26* (2013.01); *G06F 13/4282* (2013.01)

(58) Field of Classification Search
CPC ............................... G06F 1/26; G06F 13/4282
USPC ............................................................ 714/14
See application file for complete search history.

(56) References Cited

U.S. PATENT DOCUMENTS

| 2019/0037734 A1* | 1/2019 | Franz | H05K 7/20781 |
| 2020/0318842 A1* | 10/2020 | Hall, Jr. | F24F 11/46 |
| 2022/0174847 A1* | 6/2022 | Heydari | G06F 1/206 |

* cited by examiner

*Primary Examiner* — Ashish Thomas
*Assistant Examiner* — Catherine Marie Nguyen
(74) *Attorney, Agent, or Firm* — ScienBiziP, P.C.

(57) ABSTRACT

A method for resetting a baseboard management controller (BMC) and a power management system are provided. The power management system includes two or more power management controllers (PMCs). Each of the PMCs includes a BMC. One of the two or more PMCs severs as a master device and remaining of the two or more PMCs sever as one or more slave devices communicated with the master device. The method includes: generating a reset command by the master device when a first condition is met. Then the master device determines a target bus and transmits the reset command to the target slave device through the target bus. The target slave device obtains the reset command through the target bus, and resets the BMC of the target slave device, in response to the reset command.

20 Claims, 7 Drawing Sheets

METHOD FOR RESETTING BASEBOARD MANAGEMENT CONTROLLER AND POWER MANAGEMENT SYSTEM

CROSS-REFERENCE TO RELATED APPLICATIONS

This application claims priority to Chinese Patent Application No. 202211416251.9 filed on Nov. 12, 2022, in China National Intellectual Property Administration, the contents of which are incorporated by reference herein.

FIELD

The subject matter herein generally relates to power management technologies, and specially relates to a method for resetting baseboard management controller and a power management system.

BACKGROUND

An immersion liquid cooling system is a type of liquid cooling system, and it is to directly immerse the load such as the server or heating element in the cooling liquid and package it in a liquid cooling tank, so that the flow circulation of the cooling liquid can take away the heat generated by the load.

However, when a power management controller (PMC) of the liquid cooling tank of the liquid cooling system experiences communication abnormalities, such as when a baseboard management controller (BMC) of the PMC hangs, the liquid cooling tank should perform a hard reset of the BMC, which is tedious and inefficient.

Therefore, there is room for improvement within the art.

BRIEF DESCRIPTION OF THE DRAWINGS

Implementations of the present disclosure will now be described, by way of example only, with reference to the attached figures.

DETAILED DESCRIPTION

Figure 1:
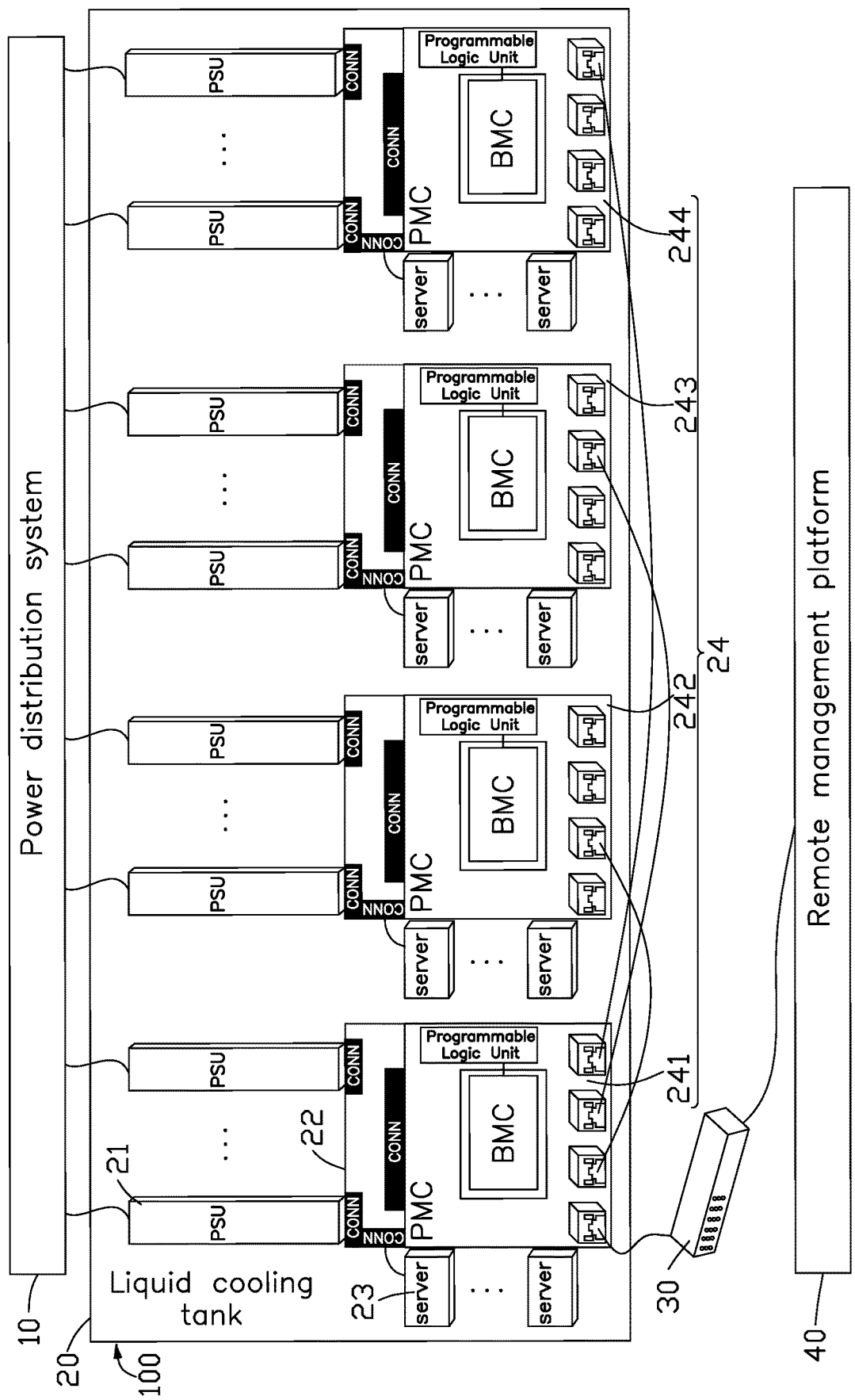
FIG. 1 is a schematic diagram illustrating a liquid cooling system according to an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better show details and features of the present disclosure.

Several definitions that apply throughout this disclosure will now be presented.

The term "coupled" is defined as connected, whether directly or indirectly through intervening components, and is not necessarily limited to physical connections. The connection may be such that the objects are permanently connected or releasably connected. The term "comprising," when utilized, means "including, but not necessarily limited to"; it specifically indicates open-ended inclusion or membership in the so-described combination, group, series, and the like.

As shown in FIG. 1, a liquid cooling system 100 is provided and includes a liquid cooling tank 20. The liquid cooling tank 20 is used to receive a cooling liquid (not shown), one or more power shelves 22, and one or more servers 23. The cooling liquid can be an insulating liquid. The servers 23 can be submerged in the insulating liquid, so that a flow circulation of the insulating liquid can take away the heat generated by the servers 23.

In this embodiment, the liquid cooling tank 20 is further used to receive one or more power supply units (PSUs) 21. As shown in FIG. 1, there are a plurality of PSUs 21, a plurality of power shelves 22, and a plurality of servers 23 received in the liquid cooling tank 20.

In this embodiment, each power shelf 22 corresponds to a group of PSUs 21 and a group of servers 23. Each group of PSUs 21 is positioned on one power shelf 22 and is connected to a power distribution system 10. The power distribution system 10 is used to provide power, such as providing alternating current (AC) power. In one embodiment, the power distribution system 10 is connected to an external utility power and supplies electric power to the liquid cooling tank 20 through the external utility power.

The PSUs 21 convert the AC power from the power distribution system 10 to direct current (DC) power and transmit the converted DC power to the power shelf 22 connected to the PSUs 21. The power shelves 22 form a centralized power supply system and each power shelf 22 can provide electric power to the servers 23 connected to the power shelf 22.

In one embodiment, the servers 23 may be liquid-cooled servers and are submerged in the insulating liquid and encapsulated inside the liquid cooling tank 20.

In this embodiment, each power shelf 22 further corresponds to a PMC. Each PMC is used to monitor a power status of the power shelf 22. For example, as shown in FIG. 1, there are four power shelves 22 received in the liquid cooling tank 20, so there are four PMCs 241, 242, 243, 244 received in the liquid cooling tank 20.

Each power shelf 22 further includes three or more connectors (CONNs). For example, the three or more CONNs include a first CONN, a second CONN, and a third CONN. The power shelf 22 is connected to the group of PSUs 21 through the first CONN, connected to the group of servers 23 through the second CONN, and connected to the PMC through the third CONN.

In this embodiment, the group of PSUs 21 transmit the converted DC power to the power shelf 22 through the first CONN. Then, the power shelf 22 transmits the DC power to the group of servers 23 through the second CONN on the power shelf 22, and to the PMC through the third CONN.

In some embodiments, the power shelf 22 can output 54V DC voltage, which is not limited in this embodiment.

In this embodiment, two or more PMCs form a power management system 24. For example, as shown in FIG. 1, the power management system 24 includes four PMCs 241, 242, 243, and 244. In other embodiments, the liquid cooling system 100 includes one or more liquid cooling tank 20. Then, the power management system 24 may be formed from two or more PMCs in different liquid cooling tanks 20.

Figure 2:
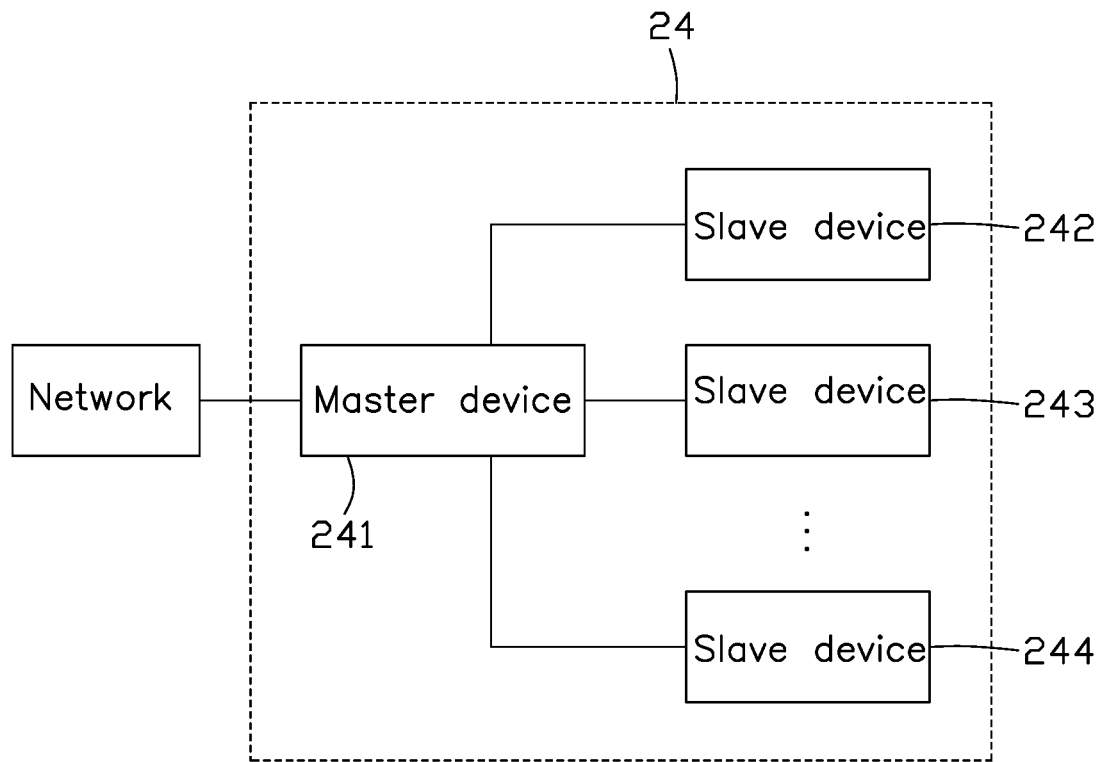
FIG. 2 is a schematic diagram illustrating a power management system connecting to a network according to an embodiment of the present disclosure.

In this embodiment, one of the PMCs serves as a master device and the remaining of the PMCs serve as slave devices. For example, as shown in FIG. 1 and FIG. 2, the PMC 241 serves as the master device. The PMCs 242, 243, and 244 serve as the slave devices. The slave devices are connected to the master device for information interaction. The master device is connected to a switch through a network, e.g., an Ethernet network. The switch 30 is connected to a remote management platform 40, thereby implementing out of band management (OOB). The remote management platform 40 can be implemented as an operation and maintenance server, etc.

In this embodiment, a placement, a quantity, and a type of each electronic component in FIG. 1 are examples, which is not specifically limited.

Figure 3:
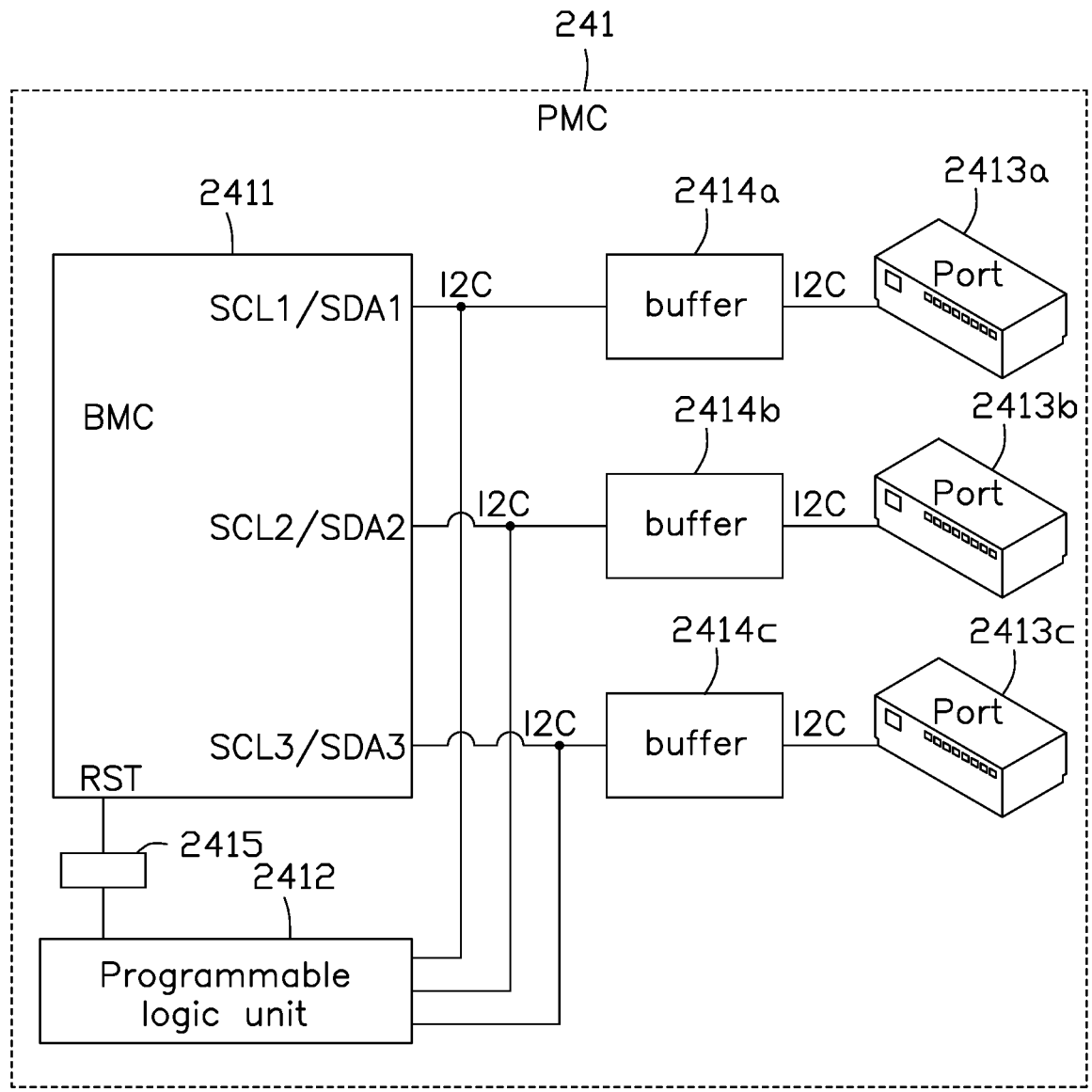
FIG. 3 is a schematic diagram illustrating a power management controller (PMC) of the power management system according to an embodiment of the present disclosure.

FIG. 3 illustrates a structure of the PMC. The structures of the PMCs are the same. In this embodiment, taking the PMC 241 as an example to introduce a specific structure of the PMC. As shown in FIG. 3, the PMC 241 includes a baseboard management controller (BMC) 2411, a programmable logic unit 2412, a plurality of ports, and a plurality of buffers.

The BMC 2411 may be used to perform monitoring operations of the PMC 241, such as monitoring and managing a health of a mainboard of the server 23. For example, the BMC 2411 can monitor and record some important parameters of the mainboard, such as voltage, temperature, power consumption, fan speed, etc. When the BMC 2411 monitors that certain parameters are abnormal, the BMC 2411 further records an alarm log and transmits the alarm log to the remote management platform 40. Then the remote management platform 40 can output fault information to the user for timely maintenance operations.

The BMC 2411 may be a small independent system. In some embodiments, when the BMC 2411 hangs during operation, an operation of the server 23 will not be directly affected, but a monitor of the BMC 2411 to the mainboard of the server 23 will be completely stopped. Then, the mainboard of the server 23 will run in a no-monitoring state and a status of the mainboard of the server 23 cannot be obtained in real time. For example, if a temperature of the mainboard of the server 23 rises at this point and a speed of a fan on the mainboard cannot be regulated, the server 23 will have a risk of downtime. Therefore, it is important to ensure that the BMC 2411 is recovered as soon as possible after it hangs to continue monitoring the mainboard of the server 23. In this embodiment, the BMC 2411 hangs means, the BMC 2411 runs a program error and cannot respond.

In this embodiment, the BMC 2411 can be an AST2500 series or AST2600 series, which can realize an out-of-band (OOB) management through Redfish protocol and monitor power status. The programmable logic unit 2412 can be a Field Programmable Gate Array (FPGA), a Complex Programmable Logic Device (CPLD), or an Erasable Programmable Logic Device (EPLD), which is not limited in this embodiment.

The buffers are all used to store data to avoid loss due to abnormal communication of the PMC 241. In this embodiment, a number of the buffers corresponds to a number of the ports. For example, as shown in FIG. 3, there are three ports 2413a, 2413b, 2413c, and three buffer 2414a, 2414b, 2414c.

In this embodiment, each buffer is connected to one port through an Inter-Integrated Circuit (I2C) bus. The three buffers are all connected to the BMC 2411 and the programmable logic unit 2412 through the I2C bus. Specifically, the I2C bus includes a clock line sI2C and a data line dI2C. The BMC 2411 of the master PMC 241 includes a first pin, a second pin, and a third pin. The first pin includes a SCL pin SCL1 and a SDA pin SDA1. The second pin includes a SCL pin SCL2 and a SDA pin SDA2. The third pin includes a SCL pin SCL3 and a SDA pin SDA3. Then, the buffer 2414a is connected to the port 2413a through the I2C bus. The buffer 2414a is also connected to the first pin SCL1/SDA1 of the BMC 2411 and the programmable logic unit 2412 through the I2C bus. The buffer 2414b is connected to the port 2413b through the I2C bus. The buffer 2414b is also connected to the second pin SCL2/SDA2 of the BMC 2411 and the programmable logic unit 2412 through the I2C bus. The buffer 2414c is connected to the port 2413c through the I2C bus. The buffer 2414c is also connected to the third pin SCL3/SDA3 of the BMC 2411 and the programmable logic unit 2412 through the I2C bus.

As shown in FIG. 3, in this embodiment, the programmable logic unit 2412 includes a branch line connected to each I2C bus of the PMC 241. The branch line can be used to receive data transmitted from the I2C bus in the event of an abnormality in the BMC 2411.

As shown in FIG. 3, in this embodiment, the BMC 2411 also includes a reset pin RST. The PMC 241 further includes a slide switch 2415. The slide switch 2415 is connected to the reset pin RST of the BMC 2411 and the programmable logic unit 2412.

Figure 4:
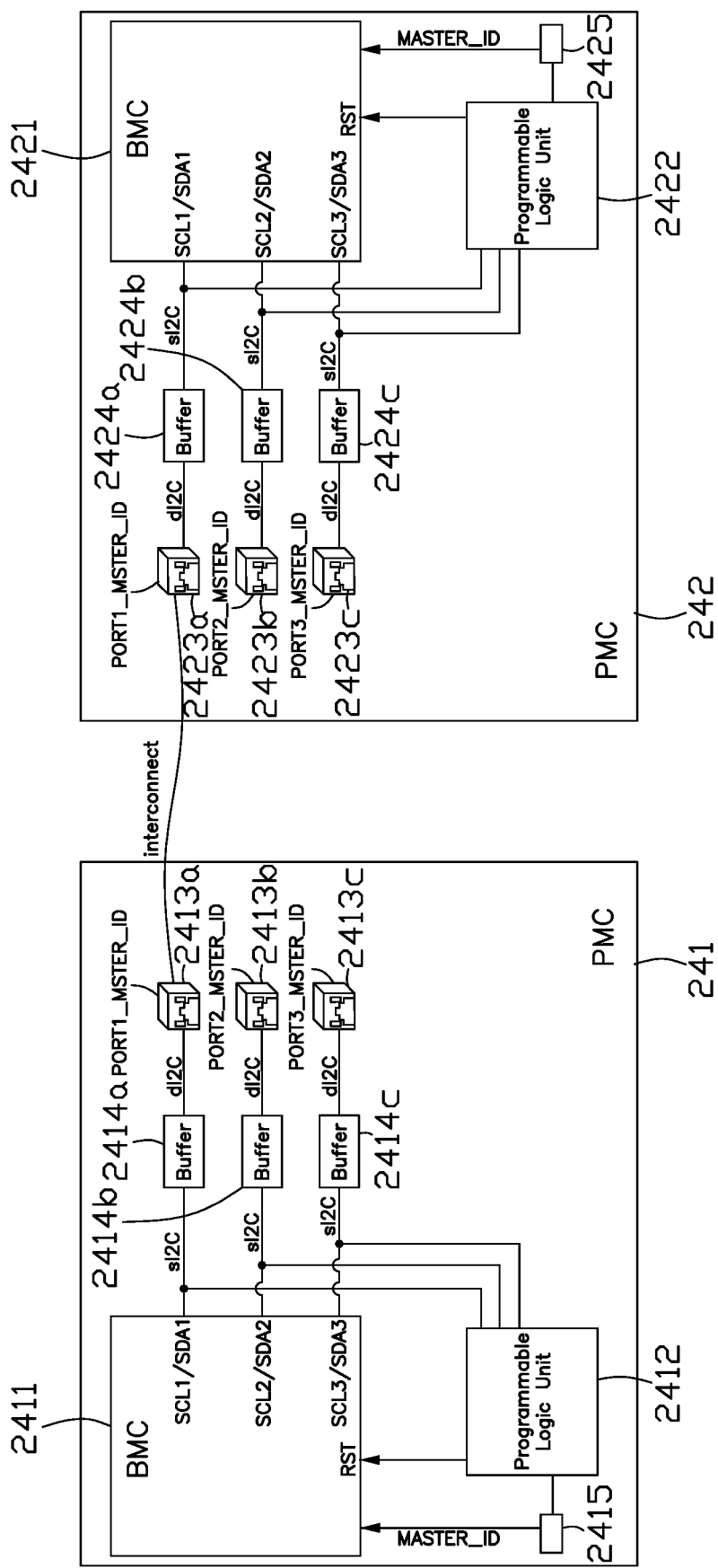
FIG. 4 is a schematic diagram illustrating an interaction between a master device and a slave device according to an embodiment of the present disclosure.

In this embodiment, for each PMC, a status of the slide switch of the PMC can be used to determine whether the PMC is a master device. As shown in FIG. 4, if the slide switch 2415 is closed, the BMC 2411 or the programmable logic unit 2412 connected to the slide switch 2415 can obtain the status of the slide switch 2415, then the PMC 241 is determined as the master device with MASTER_ID=1. Accordingly, if the slide switch 2425 is opened, the BMC 2421 or the programmable logic unit 2422 connected to the slide switch 2425 can obtain the status of the slide switch 2425, then the PMC 242 is determined as a slave device with MASTER_ID=0.

In this embodiment, for each PMC, each port of the PMC has a port ID. For example, as shown in FIG. 4, the port 2413a of the PMC 241 and the port 2423a of the PMC 242 both have a port ID being PORT1_MASTER_ID. The port 2413b of the PMC 241 and the port 2423b of the PMC 242 both have a port ID being PORT2_MASTER_ID. The port 2413c of the PMC 241 and the port 2423c of the PMC 242 both have a port ID being PORT3_MASTER_ID. Similarly, the PMCs 243 and 244 have ports whose port ID are the PORT1_MASTER_ID, the PORT2_MASTER_ID, and the PORT3_MASTER_ID.

In this embodiment, each port ID has a port ID value. The port ID value can be determined by an installation position of a communication bus. For example, the port ID value is 1 when the port is not plugged with the communication bus. The port ID value is 0 when the port is plugged with the communication bus.

For example, as shown in FIG. 1, for each PMC, the status of the slide switch on the PMC can be used to determine whether the PMC is a master device. Finally, the PMC 241 is the master device and the PMCs 242, 243, and 244 are slave devices. Then, as shown in Table 1 below, since the port ID values of the PORT1_MASTER_ID, the PORT2_MASTER_ID, and the PORT3_MASTER_ID of the PMC 241 are 000, which indicates all ports of the PMC 241 being plugged with the communication bus. Similarly, since the PORT1_MASTER_ID, the PORT2_MASTER_ID, and the PORT3_MASTER_ID of the PMC 242 are 011, the PORT1_MASTER_ID, the PORT2_MASTER_ID, and the PORT3_MASTER_ID of the PMC 243 are 101, and the PORT1_MASTER_ID, the PORT2_MASTER_ID, and the PORT3_MASTER_ID of the PMC 244 are 110, which indicate only one port of the corresponding PMC being plugged with the communication bus and the only port on the PMC is used by the PMC to receive a command (e.g. reset command) from the master device.

According to described above, the PMC 241 serves as a master device, the plurality of ports may have one port for being connected to the switch 30 and the other ports for being connected to the slave devices. The other PMCs, for example, PMC 242, 243, and 244 serve as slave devices, the plurality of ports may have one port for being connected to the master device to receive a command (e.g., reset command). Specifically, the PMC 242 receive the command from the port with port ID being PORT1_MASTER_ID, the PMC 243 receive the command from the port with port ID being PORT2_MASTER_ID, and the PMC 244 receive the command from the port with port ID being PORT3_MASTER_ID.

TABLE 1

| PORT1_MASTER_ID | PORT2_MASTER_ID | PORT3_MASTER_ID | PMC |
|---|---|---|---|
| 0 | 0 | 0 | PMC 241 |
| 0 | 1 | 1 | PMC 242 |
| 1 | 0 | 1 | PMC 243 |
| 1 | 1 | 0 | PMC 244 |

In this embodiment, the master device further pre-store a number table. The pre-stored number table may record the slave device and a bus serial number corresponding to the slave device. The bus serial number corresponding to the slave device is the bus serial number of a communication bus connecting the master device and the slave device. For example, the bus serial number of the I2C bus between the port 2413a of the PMC 241 and the port 2423a of the PMC 242 is bus1. The bus serial number of the I2C bus between the port 2413b of the PMC 241 and one port of the PMC 243 is bus2. The bus serial number of the port 2413c of the PMC 241 and one port of the PMC 244 is bus3. In other words, the number table records that the PMC 242 and its corresponding bus serial number being bus1, the PMC 243 and its corresponding bus serial number being bus2, and the PMC 244 and its corresponding bus serial number being bus3.

In this embodiment, after a target slave device is determined, the master device can determine a communication bus to transmit command to the slave device based on the pre-stored number table. For example, when the PMC 242 is determined to be the target slave device, the master device determines the communication bus of bus2 to transmit command to the PMC 242 according to the pre-stored number table. As described above, when the BMC hangs during operation, a monitor of the BMC to the mainboard of the server 23 will be completely stopped. Then, the mainboard of the server 23 will run in a no-monitoring state and a status of the mainboard of the server 23 cannot be obtained in real time. Therefore, a method for resetting the BMC is provided for ensuring that the BMC is recovered as soon as possible after it hangs.

Figure 5:
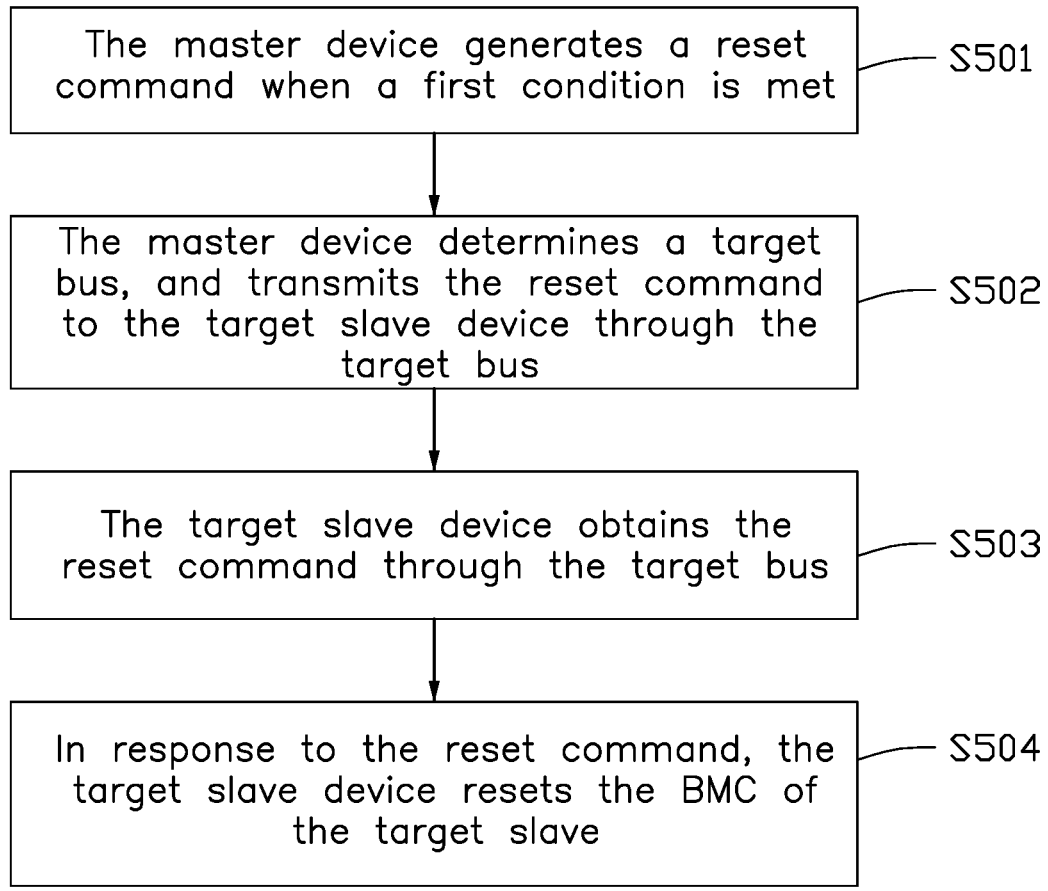
FIG. 5 is a flow chart illustrating a method for resetting a baseboard management controller (BMC) according to an embodiment of the present disclosure.

As shown in FIG. 5, the method for resetting the BMC is applied in the above power management system 24. The method for resetting the BMC includes:

At block S501, the master device generates a reset command when a first condition is met.

In this embodiment, the first condition indicates an abnormality of the BMC on a target slave device. An abnormality of the BMC includes the BMC having an abnormal operating state. For example, the BMC hangs.

In this embodiment, the reset command indicates controlling a reset of the BMC of the target slave device.

In this embodiment, the master device transmits a data packet to the slave device. When the master device does not receive a first acknowledgment character returned from the slave device within a first time period, the master device determines that the first condition is met and generates the reset command.

Specifically, the BMC of the master device may transmit data packets (e.g., heartbeat packets) to each slave device based on a predetermined time interval. The slave device receives the data packets and returns the first acknowledgment character to the master device. When the BMC of the master device does not receive the first acknowledgement character returned by the slave device within the first time period, the master device determines that the slave device did not return the first acknowledgement character is the target slave device, and determines that the first condition is met and generates the reset command.

In this embodiment, the first time period may be 3 seconds, 5 seconds, etc., which may be set according to an actual situation.

In other embodiments, the master device transmits data packets to the slave device. When the master device did not receive the first acknowledgement character returned from the slave device within the first time period, the master device generates an alarm log. The alarm log can indicate information of the slave device that did not return the first acknowledgement character. The information may include an identification of the slave device that did not return the first acknowledgement character. The master device uploads the alarm log to the remote management platform through the switch. Then, a user (for example, a technician), operates the remote management platform based on the alarm log, for example, identifies the slave device that did not return the first acknowledgement character as the target slave device. In response to the user's operation, the remote management platform transmits a first reset request to the master device.

The first reset request is configured to reset the BMC on the target slave device. When the first reset request from the remote management platform is received, the master device determines that the first condition is met and generates the reset command.

In other embodiments, for each slave device, the programmable logic unit of the slave device monitors the operating state of the BMC on the slave device. When the operating state of the BMC is abnormal, the slave device transmits a second reset request to the master device. The second reset request is configured to reset the BMC of the target slave device, and the target slave device is the slave device that sends the second reset request. When the second reset request is received, the master device determines that the first condition is met and generates the reset command.

It can be understood that, both the first reset request and the second reset request carry a unique identification of the target slave device to be reset. The unique identification can be, for example, a unique address of the target slave device. Based on the unique address, a communication between the master device and the target slave device can be enabled.

At block S502, the master device determines a target bus, and transmits the reset command to the target slave device through the target bus.

In block S502, when the master device receives the first reset request (i.e., an out-of-band reset request), the second reset request, or when the BMC of the master device does not receive the first acknowledgment character returned from the slave device at the first time period, the master device determines the slave device is the target slave device based on the first reset request or the second reset request, or the master device determines the slave device that did not return the first acknowledgment character is the target slave device.

In this embodiment, the target bus is connected between the master device and the target slave device. In other words, the target bus is a communication bus connected between the master device and the target slave device. In this embodiment, the target bus may be an I2C bus.

In block S502, when a quantity of the slave devices is two or more, the master device determines the target bus may specifically include:

Step 1: according to the pre-stored number table, the master device determines a bus serial number corresponding to the target slave device.

Step 2: the master device determines a communication bus corresponding to the bus serial number of the target slave device as the target bus.

For example, as descried above, when the PMC 242 is the target slave device, the master device identifies the communication bus with the bus serial number being bust as the target bus. When the PMC 243 is the target slave device, the master device determines that the communication bus with the bus serial number being bus2 is the target bus. When the PMC 244 is the target slave device, the master device determines that the communication bus with the bus serial number being bus3 is the target bus.

In this embodiment, after the master device determines the target bus, the master device determines a first target port of the master device connected to the target bus, and then transmits the reset command to the target slave device through the first target port and the target bus.

At block S503, the target slave device obtains the reset command through the target bus.

In some embodiments, the target slave device obtains the reset command through the target bus including:

Step 1: the target slave device obtains a port ID of a target port. The target port is the port of the target slave device that connects to the master device through the target bus.

Step 2: the target slave device determines the target port based on the port ID.

Step 3: the target slave device obtains the reset command from the target bus of the target port.

For example, as described above, when the PMC 241 is the master device and the PMC 242 is the target slave device, the target bus of bus1 is connected to the port 2413*a* of the master device and the port 2423*a* of the PMC 242, and the port 2423*a* is the target port of the target slave device. Then, the master device transmits the reset command to the target slave device through the port 2413*a* and the bus1. The programmable logic unit 2422 of the target slave device obtains the port ID of the port 2423*a* is PORT1_MASTER_ID, and then obtains the reset command transmitted by the target bus from the port 2423*a* according to the port ID of the PORT1_MASTER_ID.

In other embodiments, the target slave device obtains the reset command through the target bus including:

Step 1: the target slave device determines a target buffer corresponding to the target bus. The target buffer stores the data transmitted on the target bus.

Step 2: the target slave device obtains the reset command from the target buffer.

For example, as shown in FIG. 4, when the PMC 242 is the target slave device, then the buffer 2424*a* is the target buffer that stores the data transmitted on the target bus, and the programmable logic unit 2422 of the target slave device obtains the reset command from the buffer 2424*a*.

In some embodiments, the programmable logic unit of the PMC may have a corresponding application program. The application program is executed to obtain the data transmitted on the target bus when the PMC communicates abnormal or the BMC abnormal, which is not specifically limited by this application.

At block S504, in response to the reset command, the target slave device resets the BMC of the target slave device.

In this embodiment, in response to the reset command, the programmable logic unit of the target slave device outputs a reset signal to the reset pin RST of the BMC of the target slave device for resetting the BMC of the target slave device.

In some embodiments, the PMC further includes a reset register storing a reset logic. In response to the reset command, the programmable logic unit of the target slave device obtains the reset logic from the reset register, executes the reset logic, and then outputs the reset signal to the reset pin RST of the BMC of the target slave device for resetting the BMC of the target slave device.

In some embodiments, after the target slave device performs a reset according to the reset command, the target slave device generates a second acknowledgment character and transmits the second acknowledgment character to the master device. When the master device does not receive the second acknowledgment character from the target slave device within a second time period, the master device transmits the reset command to the target slave device. When the master device receives the second acknowledgment character from the target slave device within the second time period, the master device establishes a communication connection with the target slave device. The master device re-establishes the communication connection for the service with the target slave device, resumes forwarding data from the target slave device to the remote management platform, and forwarding commands from the remote management platform to that target slave device.

In this embodiment, the second time period may be 5 seconds, 10 seconds, etc., and the second time period may be set according to the actual situation.

In this embodiment, when the slave device communicates is abnormal, such as the BMC of the slave device hangs, the master device transmits a reset command to the programmable logic unit of the slave device. Then, the programmable logic unit performs a soft reset operation on the BMC for automatically resetting the PMC, which is simpler and more effective.

Further, the master device transmits the reset command through a I2C bus, and each slave device has its own unique communication bus corresponding to the master device, which can avoid a risk of false triggering caused by the BMC of the master device directly resetting the slave device through GPIO pins. Specifically, by identifying the port ID of the target port on the target slave device, the risk of false triggering caused by resetting the slave device is avoided.

Figure 6:
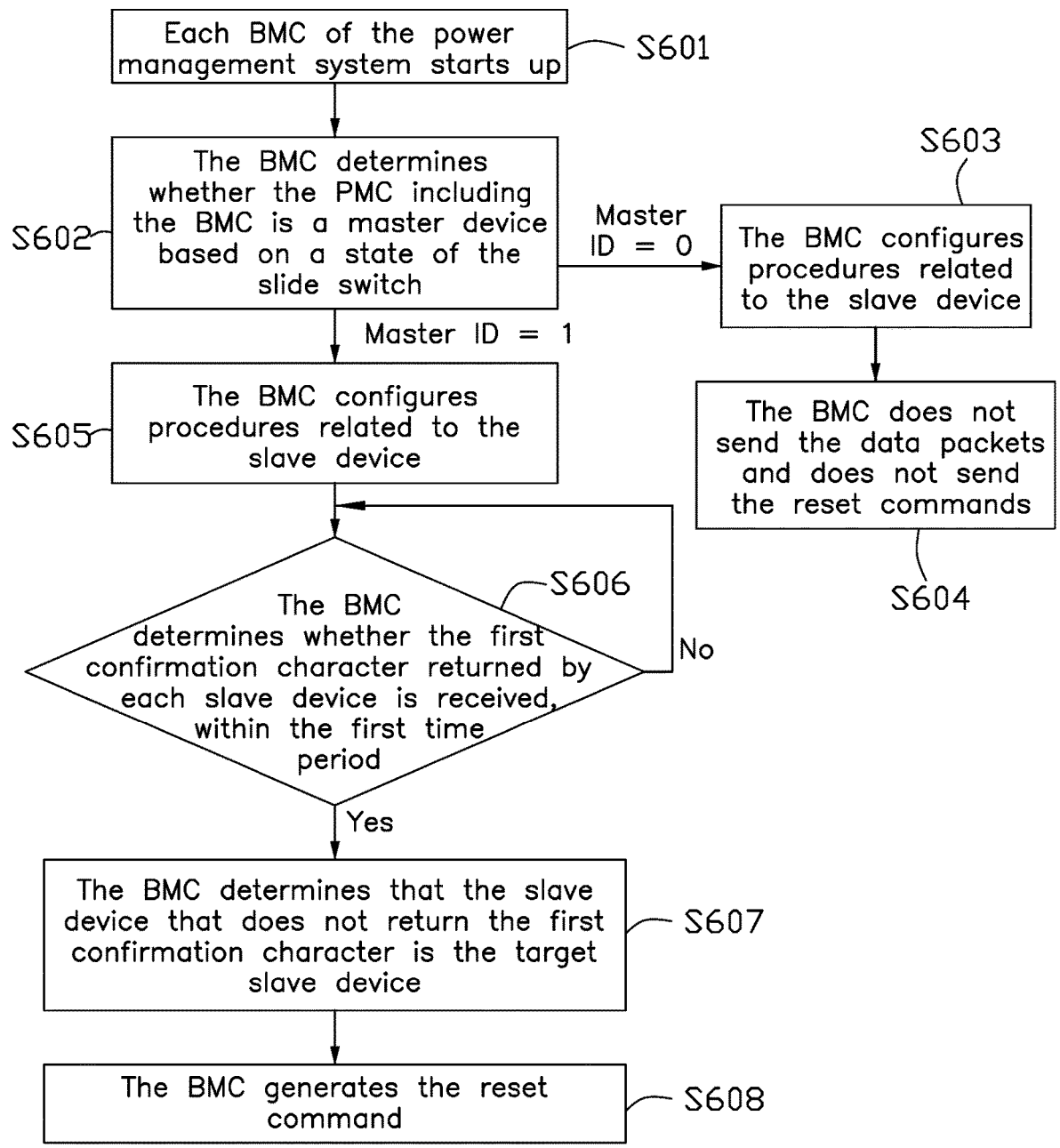
FIG. 6 is a flow chart illustrating a method for resetting the BMC according to another embodiment of the present disclosure.

FIG. 6 is a flow chart of another embodiment of a method for resetting the BMC. As shown in FIG. 6, the method for resetting the BMC includes:

At block S601, each BMC of the power management system starts up.

At block S602, the BMC determines whether the PMC including the BMC is a master device based on a state of the slide switch.

In block S602, if the state of the slide switch is opened, that is MASTER_ID=0, the BMC determines that the PMC including the BMC is a slave device and block S603 and block S604 are performed. If the state of the slide switch is closed, that is MASTER_ID=1, the BMC determines that the PMC including the BMC is a master device and blocks S605-S608 are performed.

At block S603, the BMC configures procedures related to the slave device.

The procedures related to the slave device is used to indicate the actions to be performed by the slave device. In block S603, the BMC configures the slave device related procedures, then block S604 are performed.

At block S604, the BMC does not send the data packets and does not send the reset command.

At block S605, the BMC configures procedures related to the master device.

In block S605, the procedures related to the master device is used to indicate the actions to be performed by the master device. The actions to be performed by the master device includes the BMC sends the data packets and the BMC sends the reset command.

At block S606, the BMC determines whether the first confirmation character returned by each slave device is received, within the first time period.

In block S606, when the BMC determines the first confirmation character returned by each slave device is not received, block S606 is performed. When the BMC determines the first confirmation character returned by each slave device is received, block S607 and S608 are performed.

At block S607, the BMC determines that the slave device that does not return the first confirmation character is the target slave device.

At block S608, the BMC generates the reset command.

In block S608, the reset command is used to reset the target slave device. In this embodiment, when the BMC generates the reset command, the BMC can further determine a target bus and transmits the reset command to the target slave device, which is similar to block S502 and is not described here.

Figure 7:
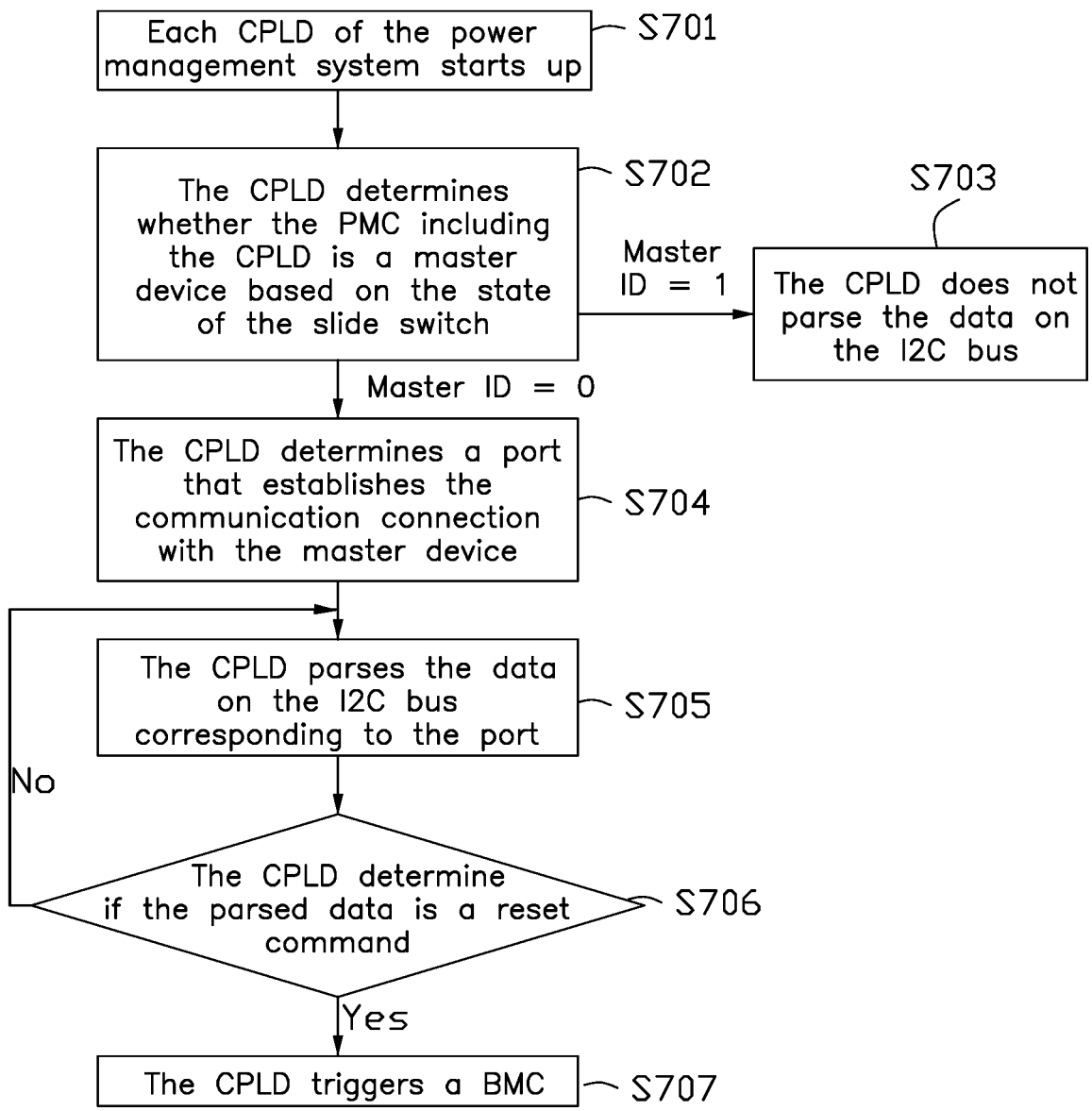
FIG. 7 is a flow chart illustrating a method for resetting the BMC according to another embodiment of the present disclosure.

FIG. 7 is a flow chart of another embodiment of a method for resetting the BMC. In this embodiment, taking each programmable logic unit of the power management system 24 being a CPLD as an example. The method of FIG. 7 is similar to the method of FIG. 6, and a difference is that the method of FIG. 7 is performed by the CPLD. In detail, as shown in FIG. 7, the method for resetting the BMC includes:

At block S701, each CPLD of the power management system starts up.

At block S702, the CPLD determines whether the PMC including the CPLD is a master device based on the state of the slide switch.

In block S702, if the state of the slide switch is closed, that is Master ID=1, the CPLD determines that the PMC including the BMC is a master device and blocks S607 is performed. If the state of the slide switch is opened, that is Master ID=0, the CPLD determines that the PMC including the CPLD is a slave device and block S704-S707 are performed.

At block S703, the CPLD does not parse the data on the I2C bus.

At block S704, the CPLD determines a target port that establishes the communication connection with the master device.

In block S704, the CPLD determines the target port that establishes the communication connection with the master device according to Table 1, which is similar to block S503 and is not descried here.

At block S705, the CPLD parses the data on the I2C bus corresponding to the target port.

At block S706, the CPLD determine if the parsed data is a reset command. when the CPLD determine the parsed data is the reset command, block S707 is performed. when the CPLD determine the parsed data is not the reset command, block S705 is performed.

At block S707, the CPLD triggers a BMC.

In block S707, when the CPLD determine the parsed data is the reset command, the CPLD determines that its corresponding slave device is a target slave device, then resets the BMC on that target slave device, which is similar to block S504 and is not descried here.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A method for resetting baseboard management controller (BMC) applied in a power management system, the power management system provided with two or more power management controllers (PMCs), each of the two or more PMCs provided with a BMC, one of the two or more PMCs severing as a master device, remaining of the two or more PMCs severing as one or more slave devices and communicated with the master device, the method comprising:
generating a reset command by the master device when a first condition is met, wherein the first condition indicates an abnormality of a BMC of a target slave device of the one or more slave devices;
determining a target bus by the master device, wherein the target bus is connected between the master device and the target slave device;
transmitting the reset command by the master device to the target slave device through the target bus;
obtaining the reset command by the target slave device through the target bus; and
resetting the BMC of the target slave device by the target slave device in response to the reset command.

2. The method of claim 1, wherein when a quantity of the one or more slave devices is two or more, determining the target bus by the master device further comprises:
determining a bus serial number corresponding to the target slave device according to a pre-stored number table, wherein the pre-stored number table records the one or more slave devices and the bus serial numbers corresponding to the one or more slave devices; and
determining a communication bus corresponding to the bus serial number of the target slave device as the target bus.

3. The method of claim 2, wherein generating the reset command by the master device when the first condition is met, further comprises:
transmitting a data packet to the one or more slave devices by the master device; and
determining the first condition is met and generating the reset command by the master device when the master device does not receive a first acknowledgement character returned from the one or more slave devices within a first time period.

4. The method of claim 2, wherein the master device is configured to connect to a remote management platform through a switch, and generating the reset command by the master device when the first condition is met, further comprises:
transmitting a data packet to the one or more slave devices by the master device;
generating an alarm log by the master device when the master device does not receive a first acknowledgement character returned from the one or more slave devices within a first time period;
uploading the alarm log to the remote management platform by the master device through the switch;
receiving a first reset request from the remote management platform by the master device; and
generating the reset command by the master device in response to the first reset request.

5. The method of claim 2, wherein generating the reset command by the master device when the first condition is met, further comprises:
transmitting a second reset request to the master device by the target slave device in response to the abnormality of the BMC of the target slave device; and
generating the reset command by the master device in response to the second reset request.

6. The method of claim 1, wherein obtaining the reset command by the target slave device through the target bus, further comprises:
obtaining a port ID of a target port of the target slave device, wherein the target port is connected to the master device through the target bus; and
obtaining the reset command through the target bus based on the port ID.

7. The method of claim 1, wherein each of the two or more PMCs further comprises at least one buffer, the at least one buffer of the PMC served as the master device is arranged on at least one communication bus, the at least one communication bus is connected between each of the one or more slave devices and the master device, wherein obtaining the reset command by the target slave device through the target bus, further comprises:
determining a target buffer from the at least one buffer corresponding to the target bus; and
obtaining the reset command from the target buffer.

8. The method of claim 1, wherein each of the two or more PMCs further comprises a programmable logic unit, wherein resetting the BMC of the target slave device by the target slave device in response to the reset command, further comprises:
outputting a reset signal by the programmable logic unit of the target slave device in response to the reset command; and
receiving the reset signal by a reset pin of the BMC of the target slave device to cause the BMC to reset.

9. The method of claim 8, wherein each of the two or more PMCs further comprises a reset register, wherein outputting the reset signal by the programmable logic unit of the target slave device in response to the reset command, further comprises:
obtaining a reset logic from the reset register in response to the reset command; and
executing the reset logic and outputting the reset signal to the reset pin of the BMC of the target slave device.

10. The method of claim 1, wherein after the target slave device performs the reset according to the reset command, the method further comprises:
generating a second acknowledgement character and transmitting the second acknowledgement character to the master device by the target slave device; and
transmitting the reset command to the target slave device by the master device when the master device does not receive the second acknowledgement character within a second time period.

11. A power management system, comprising:
two or more power management controllers (PMCs), each of the two or more PMCs comprising a baseboard management controller (BMC), one of the two or more PMCs severing as a master device, remaining of the two or more PMCs severing as one or more slave devices and communicated with the master device,
wherein the master device is configured to:

generate a reset command when a first condition is met, wherein the first condition indicates an abnormality of a BMC of a target slave device of the one or more slave devices, determine a target bus, wherein the target bus is connected between the master device and the target slave device, and transmit the reset command to the target slave device through the target bus, the target slave device is configured to:

obtain the reset command through the target bus, and reset the BMC of the target slave device in response to the reset command.

12. The power management system of claim 11, wherein when a quantity of the one or more slave devices is two or more, the master device is further configured to:

determine a bus serial number corresponds to the target slave device according to the pre-stored number table, wherein the pre-stored number table records the one or more slave devices and the bus serial numbers corresponding to the one or more slave devices, and determine a communication bus corresponding to the bus serial number of the target slave device as the target bus.

13. The power management system of claim 12, wherein when the master device is configured to generate the reset command when the first condition is met, the master device is further configured to:

transmit a data packet to the one or more slave devices, and determine the first condition is met and generate the reset command, when the master device does not receive a first acknowledgment character returned from the one or more slave device within a first time period.

14. The power management system of claim 12, wherein when the master device is configured to connect to a remote management platform through a switch, then generate a reset command when a first condition is met, the master device is further configured to:

transmit a data packet to the one or more slave devices, generate an alarm log when the master device does not receive a first acknowledgement character returned from the one or more slave devices within a first time period, upload the alarm log to the remote management platform through the switch receive a first reset request from the remote management platform, and generate the reset command in response to the first reset request.

15. The power management system of claim 12, wherein when the master device is configured to generate the reset command when the first condition is met, the master device is further configured to:

receive a second reset request from the target slave device in response to the abnormality of the BMC of the target slave device, and generate the reset command in response to the second reset request.

16. The power management system of claim 11, wherein when the target slave device is configured to obtain the reset command through the target bus, the target slave device is further configured to obtain a port ID of a target port of the target slave device, wherein the target port is connected to the master device through the target bus, and obtain the reset command through the target bus based on the port ID.

17. The power management system of claim 11, wherein each of the two or more PMCs further comprises at least one buffer, the at least one buffer of the PMC served as the master device is arranged on at least one communication bus, the at least one communication bus is connected between each of the one or more slave devices and the master device, then when the target slave device is configured to obtain the reset command through the target bus, the target slave device is further configured to determine a target buffer from the at least one buffer corresponding to the target bus, and obtain the reset command through the target buffer.

18. The power management system of claim 11, each of the two or more PMCs further comprises a programmable logic unit, then when the target slave device is configured to reset the BMC of the target slave device in response to the reset command, the programmable logic unit on the target slave device is configured to output a reset signal to a reset pin of the BMC of the target slave device in response to the reset command to cause the BMC to be reset.

19. The power management system of claim 18, each of the two or more PMCs further comprises a reset register, when the programmable logic unit on the target slave device is configured to output the reset signal to the reset pin of the BMC of the target slave device in response to the reset command, the programmable logic unit is further configured to obtain a reset logic from the reset register in response to the reset command, and execute the reset logic and output the reset signal to the reset pin of the BMC of the target slave device.

20. The power management system of claim 11, wherein after the target slave device resets the BMC of the target slave device according to the reset command, the target slave device is further configured to generate a second acknowledgement character and transmit the second acknowledgement character to the master device, and the master device is further configured to transmit the reset command to the target slave device when the master device does not receive the second acknowledgement character within a second time period.

* * * * *